United States Patent [19]

Keeble

[11] Patent Number: 5,187,362

[45] Date of Patent: Feb. 16, 1993

[54] LOSS DETECTION IN A BRANCHED OPTICAL FIBER

[75] Inventor: Peter J. Keeble, Ipswich, England

[73] Assignee: British Telecommunications public limited company, London, England

[21] Appl. No.: 688,551

[22] PCT Filed: Dec. 5, 1989

[86] PCT No.: PCT/GB89/01454

§ 371 Date: Jun. 25, 1991

§ 102(e) Date: Jun. 25, 1991

[87] PCT Pub. No.: WO90/06498

PCT Pub. Date: Jun. 14, 1990

[30] Foreign Application Priority Data

Dec. 6, 1988 [GB] United Kingdom ............... 8828408

[51] Int. Cl.5 .................. H01J 5/16; G01N 21/00
[52] U.S. Cl. ........................... 250/227.15; 356/73.1
[58] Field of Search ............... 356/73.1; 250/227.11, 250/227.12, 227.15, 227.16, 277.21, 227.23, 227.17, 227.18, 227.19

[56] References Cited

U.S. PATENT DOCUMENTS 4,713,538 12/1987 Theocharous ............ 250/227.23
4,816,669 3/1989 Anderson ............... 356/73.1

FOREIGN PATENT DOCUMENTS 0113351 9/1979 Japan .................. 356/73.1
2136113 9/1984 United Kingdom ........ 356/73.1
2190264 11/1987 United Kingdom ........ 356/73.1

OTHER PUBLICATIONS

AEG-Telefunken Kabelwerke AG-Development Center-"on site location of optical fiber defects and evaluation of transmission loss", Nov. 1977 B. Hillerick.

Primary Examiner—David C. Nelms
Assistant Examiner—Hoa Q. Pham
Attorney, Agent, or Firm—Nixon & Vanderhye

[57] ABSTRACT

A method is described of detecting loss in a branched optical fibre network comprising a first optical fibre (1) and a plurality of second optical fibres (3) each of which is coupled to the first optical fibre. The first optical fibre (1) constitutes a main line. The method comprises the steps of launching a pulse into the main line (1) and monitoring the main line for changes in attenuation of reflected signals returning from the reflectors (5).

15 Claims, 1 Drawing Sheet

LOSS DETECTION IN A BRANCHED OPTICAL FIBER

FIELD OF THE INVENTION

This invention relates to detection and measurement of losses in a branched optical fibre network.

BACKGROUND OF THE INVENTION

It is well known that faults in optical fibres can be located by an OTDR (optical time domain reflectometer). An OTDR launches a pulse of light into a fibre, and backscattered light is monitored for abrupt changes indicative of a fault, the time between pulse launch and the detection of the light at the launch end being indicative of the distance along the fibre that the fault occurs. In addition to back scattered light, there may be a Fresnel reflection from the far end of the fibre. Suggestions have been made to use reflection of an outbound pulse, (see Electronics Letters Vol. 20 No. 8, Gold, Hartog and Payne), regarding it as equivalent to launching a pulse at the far end of the fibre, and monitoring the backscattered light resulting from the reflection to give, in combination with the monitoring of the backscattering from the outbound pulse, in effect a simulated, double-ended OTDR. However, no suggestion has been made to monitor the reflection peak itself to provide information relating to losses.

In branched networks, it would be extremely costly to monitor each line separately from the most diversified end. It is, therefore, desirable to be able to monitor the branch lines from a centralised location, such as an exchange. If an OTDR is used, then the backscattered light from each branch line is combined on its return to the junction of the branches, and it is not possible to determine from which branch line it originated, although a distance from the pulse source is known. Also, in a branched network, the power of the outbound pulse is divided into the branch lines. Thus, the information relating to any branch line has only a strength related to the backscattering from the portion of the pulse in that branch line superimposed on the information from all the other branch lines, which will decrease the resolution thereby reducing the dynamic range of the instrument and sensitivity of attenuation measurement in a particular branch line. In general, an OTDR at present has a backscatter range limitation of approximately 20 dB for a 100 ns pulse width. Thus, if the branch lines are of substantial length and/or diversity, it may not be possible to monitor the entire network by normal OTDR methods. In any event, specific branch line(s) at fault would not be identified.

The aim of the present invention is to enable individual monitoring of branch lines in a branched network upstream from the branching point.

SUMMARY OF THE INVENTION

The present invention provides a method of detecting loss in a branched optical fibre network comprising a first optical fibre and a plurality of second optical fibres each of which is coupled to the first optical fibre, the first optical fibre constituting a main line and the second optical fibres constituting branch lines, a respective reflector being associated with each of the branch lines, the method comprising the steps of launching a pulse into the main line and monitoring the main line for attenuation of reflected signals returning from the reflectors, a monitored attenuation of a given reflected signal being indicative of loss in the branch line associated with the reflector giving rise to that reflected signal.

Advantageously, the reflected signals are monitored with respect to a reference signal. Preferably, the reflected signals are monitored with respect to a reference reflection signal from a location positioned in the main line.

Preferably, pulses of different frequency are launched into the main line, and reflection from reflectors having different wavelength responses is monitored.

The invention also provides apparatus for detecting losses in a branched optical fibre network comprising a first optical fibre and a plurality of second optical fibres each of which is coupled to the first optical fibre, the first optical fibre constituting a main line and the second optical fibres constituting branch lines, the apparatus comprising means for launching a pulse into the main line, a respective reflector located in the path of the pulse in each of the branch lines, and means for monitoring the main line for attenuation of reflected signals returning from the reflectors, a monitored attenuation of a given reflected signal being indicative of loss in the branch line associated with the reflector giving rise to that reflected signal.

Advantageously, at least one of the branch lines is provided with a plurality of reflectors, and the apparatus further comprises means for generating a reference signal, said means being located in the path of the pulse. A reference reflector located in the main line may constitute the reference signal generating means.

Each reflector may be located within the associated branch line. Alternatively, each reflector is located externally of the associated branch line. In this case, each reflector may be located at a termination of the associated branch line.

Conveniently, each reflector is a passive optical reflector.

Preferably, each reflector comprises means for reflecting a distinguishable portion of the pulse. Advantageously, the distinguishable portion is a particular wavelength or range of wavelengths.

BRIEF DESCRIPTION OF THE DRAWINGS

The invention will now be described in greater detail, by way of example, with reference to the accompanying drawings, in which.

DETAILED DESCRIPTION OF THE DRAWINGS

Figure 1:
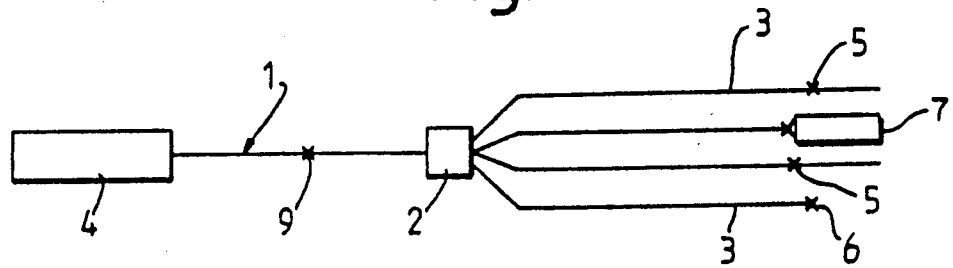
FIG. 1 is a schematic diagram of a branched network in which the invention may be utilised.

Referring to the drawings, FIG. 1 shows a branched network constituted by a main optical fibre transmission line 1, a coupling array 2, and a plurality of branch lines 3. The coupling array 2 may typically comprise an array of 2×2 couplers, whereby the main line 1 is split into n output (branch) lines 3, each output line containing information carried by the main line. A commercially available OTDR 4 constituted by a pulse generator and a return signal monitor is connected to the input end of the main line 1.

A pulse launched into the main line 1 proceeds to the coupling array 2, and is split n ways into the branch lines 3. At a reflector 5 in each branch line 3, the pulse is reflected back towards the OTDR 4. Each reflector 5 may be any suitable reflector, for example a cleaved end of the branch line fibre, a reflecting surface applied to the fibre, or a mirror or grating such as 6 disposed within (or beyond) the far end of the branch line fibre. The reflectors 5 may be arranged to reflect all or a part of the signal pulse. It should be noted that the fraction of the launched pulse power reflected needs to be constant, over a range of environmental conditions, if any change in the amplitude of the reflected pulse is to be attributed to a change in incident pulse power, and hence to network attenuation.

Figure 2:
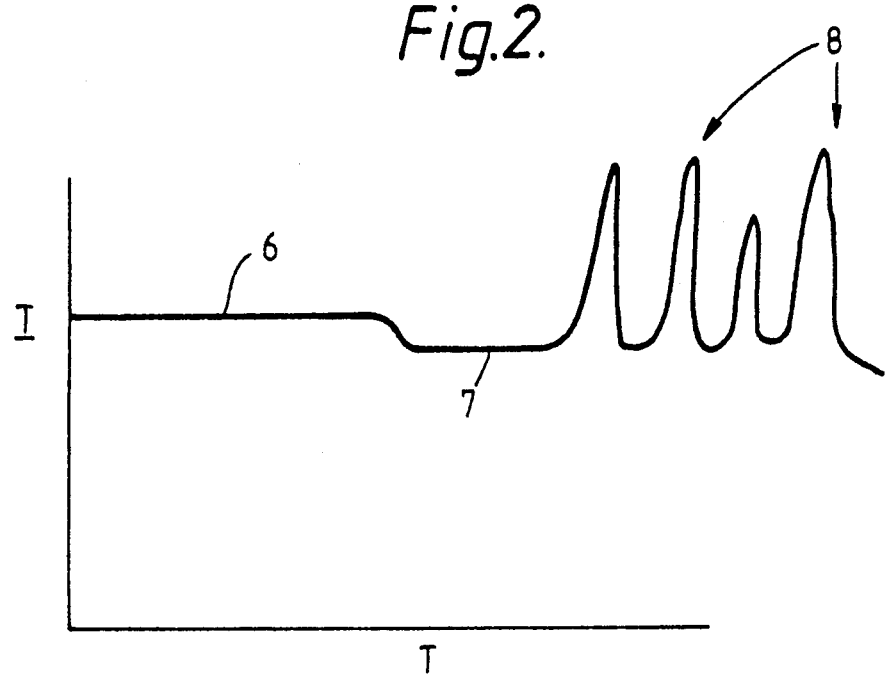
FIG. 2 is a diagram of a trace of a monitored return signal.

FIG. 2 shows a typical OTDR oscilloscope trace that is obtained by displaying the signal returning to the OTDR 4. Initially, the signal is at a first level 6 corresponding to returning backscattered light as the signal pulse travels along the main line 1. There is then a drop in signal level, caused by the losses in the coupling array 2, and the returning signal then continues at a second, lower level 7 corresponding to the combined backscattered signals of the divided pulse as it travels along each of the branch lines 3. Finally, a series of peaks 8 are shown which correspond to the return signals from the reflections at the reflectors 5. In the arrangement shown and described hereinafter, it is assumed that the reflections occur at the ends of the branch lines 3, which is the preferred arrangement. However, it should be realised that, if the reflections are not at the ends of the branch lines 3, there may be information resulting from a continuing propagation of a part of the pulse in the outbound direction.

The trace described and shown in FIG. 2 includes signals from backscattered light, and represents the signal that would be received by the OTDR 4. It will be observed that the reflection signal peaks 8, are of significantly higher intensity than the backscattering signal levels 6 and 7. Typically, a reflected signal from a cleaved fibre end may be approximately 14 dB below the incident power level, compared with backscattered power level which is approximately 60 dB below the incident power level. Thus, if only resolution of the peaks 8 is required, the same equipment will have an increased dynamic range of the order of 23 dB, since a conventional OTDR displays the reflection peak amplitude as half its real value. Other types of reflectors, such as a mirrored end reflector which reflects more than 95% of the incident pulse power, could be used with a corresponding increase in dynamic range. Alternatively, less sensitive equipment may be used for resolving reflected signals than is necessary to resolve backscattered signals over a comparable path length.

In the illustrated trace, the peaks 8 are shown spaced apart, and this will be the case when the individual branch lines 3 are of different lengths, so that the reflections occur at different times. The actual peak spacing depends upon pulse width (a wider pulse will broaden the reflection peak) and the difference in the distance travelled to the reflectors 5 in the different branch lines 3. With a pulse width of around 200 nm, a branch line length difference of the order of 40 meters is required in order to give peak separation. Using a pulse width of 100 nm, for example, would enable the required path length difference to be reduced to of the order of 20 meters. Path length difference (or temporal pulse separation) may be ensured by incorporation of fibre loops (or delay loops) into the branch lines 3.

In the event that the branch lines 3 are of the same length, and delays are not included, then the peaks 8 are superimposed, and it is necessary to have some other means (i.e. other than temporal separation resulting from path length difference) of distinguishing, at the monitoring end, between the separate branch line peak components of the compound peak. This may be achieved by arranging for the different branch lines 3 to reflect light of different wavelengths. In this case, the pulse generator of the OTDR 4 could be a tunable pulse source, such as a tunable laser, or a range of different wavelength pulse sources that are sequentially operated, and the peaks corresponding to the different wavelength reflectors could be monitored in turn as the corresponding wavelength is launched into the fibre. Alternatively, a broad band pulse source may be utilised, and the wavelengths separated in the monitor receiver. A further alternative is to impose differing modulations at each reflector 5 by way of a modulating means such as 7. A single continuous (i.e. non-pulsed) wavelength may then be used, in which case the receiver would be turned to the modulation frequency of each reflector 5 in turn, and the peak or RMS amplitude measured.

Whatever the method of peak separation each reflector 5 reflects a distinguishable portion of the launched pulse that can be identified and related to its specific branch line 3. Moreover, if there is more than one reflector 5 in a given branch line 3, the positions of individual reflectors in that line can also be determined, for example for a knowledge of the relative branch line lengths to the individual reflectors, or by imposing identifying signals on each branch line, or by selectively attenuating each branch line reflection in turn and observing which peak becomes attenuated.

Having established which peak 8 corresponds to which branch line 3, the peaks are monitored, either continuously or intermittently, to see whether any become attenuated, a reduction in the amplitude of the return reflected peak signal from a given branch line being indicative of losses in that particular branch line. In some cases, it may be possible to determine peak attenuation visually. The OTDR 4 does not, however, give an accurate measurement of attenuation, so it is preferable to link the OTDR to a computer (not shown) which can read the OTDR measurements and calculate (using the theory described below) either the absolute attenuation between two points in the network, or the change in attenuation.

Once it is known which branch line 3 is at fault, the distance along the line of the fault can be established by usual OTDR backscattering monitoring. In the event that the branch lines 3 being monitored are of a length that the fault lies beyond the dynamic range of resolution of the backscattering signals, the OTDR measurement may be made from a different location, such as from an intermediate location in the main line 1 or from the far end of the faulty branch line 3.

An alternative method of establishing the distance of the fault from the pulse source (the OTDR 4) is to provide a series of reflectors 5 in each branch line 3, so that attenuation of the peak 8 from a particular reflector indicates that the fault lies in the link corresponding to the portion of fibre between the reflector from which attenuation is detected and the previous reflector. In such an arrangement, the intermediate reflectors 5 would each need to permit some continuing propagation, for example by partial reflection of the pulse amplitude, or by reflecting only a particular wavelength different to that of the other reflectors in the same path. This arrangement, in addition to usefulness for identifying branch lines 3, has particular applicability where resolution over a large dynamic range is necessary, not necessarily in branch lines. If the information signals on the transmission line are of a wavelength that would be attenuated by the reflectors, then it is preferable for the reflectors to have a reflectivity in the range of up to 50%, usually at least 0.5%. However, if wavelengths not used for the transmission of information signals are used greater reflectivity may be utilised.

Although in theory it is only necessary to monitor the peak intensity, in practice it is preferable to exclude fluctuations that may occur on the main line 1 or in the launched signal. For example, there are variations in peak intensity due to environmental affects on the network and on the reflectors 5. In practice, these variations in peak intensity are of the order of 1 dB, this figure depending upon the complexity of the network. Therefore, instead of monitoring the peak values with reference to a fixed datum, it is preferred to monitor the peak value with reference to a signal value established on the network that will fluctuate in the same way, and be responsive to the same conditions as, the peak values. For this purpose, a reference point 9 within the main line 1 is selected, and a specific marker or indication of the reference location is incorporated into the network by providing a partially-reflective member or an attenuating member at the reference point. With this system, only attenuation of a peak 8 relative to the reference point 9 is indicative of new losses.

Figure 3:
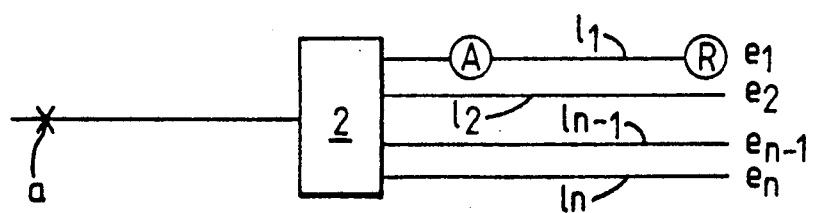
FIG. 3 is a schematic diagram illustrating how to calculate the change in attenuation in the type of branched network shown in FIG. 1.

The change in attenuation of a branch of a branched network as shown in FIG. 3 may be calculated using the method according to the invention as shown below. The branch $l_1$ has a reflector R at its end $e_l$, and the main line 1 has a reference point a. It is assumed that the pulse is launched from the OTDR, that a fault occurs in branch line $l_1$, and that the backscattering values are also included.

A = Increase in attenuation of path $e_l$ due to fault.
P = Optical power present at a in pulse travelling from the OTDR 4.
$L_B$ = Fraction of pulse power backscattered from the fibre at any one position.
$K_n$ = Fraction of pulse power at a present at $e_n$ for path n.
$L_R$ = Fraction of power reflected from each end e.
$L_{ae}$ = Loss from point a to point e measured by the OTDR.

Power backscattered from point a $= P \cdot L_B$
Power decrease from a to $e_l = K_1 \cdot A$
Backscattered power from $e_l$ arriving at a $= K_1^2 \cdot A^2 \cdot P \cdot L_B$
and reflected power from $e_l$ arriving at a $= K_1^2 \cdot A^2 \cdot P \cdot L_R$
Now, power decrease from a to $e_n = K_n$
Backscattered power from $e_n$ arriving at a $= K_n^2 \cdot P \cdot L_B$
Assume $K_1 = K_2 = \ldots K_n$ and that m of paths n=2 to n are of length $l_n > l_l$, then:

Total backscattered power from $e_2$ to $e_m$ arriving at $a =$

-continued
$$\sum_{n=2}^{n=m} K_n^2 \cdot P \cdot L_B$$

Let $P = 1$ and $L_B = 1$ (since the absolute values of $L_B$ and $L_R$ are not required to measure change in attenuation, only their relative values are needed), and since the OTDR 4 takes the square root of the total backscattered and reflected light received from $e_l$ to $e_n$ then $$L_{ae} \text{ (dB)} = 10 \log \frac{1}{\sqrt{(mK_1^2 + K_1^2 A^2 + K_1^2 A^2 L_R L_B^{-1})}}$$

Now, assume that $K_1^2 A^2 << K_1^2 A^2 L_R L_B^{-1}$ then $$L_{ae} \text{ (dB)} \approx 10 \log \frac{1}{\sqrt{(mK_1^2 + K_1^2 A^2 L_R L_B^{-1})}} \quad (1)$$

or, to determine the attenuation A present in path $L_1$, $$A\text{(dB)} = 10 \log \left[ \frac{\left[ \left( \frac{1}{\text{invlog}\left(\frac{L_{ae}}{10}\right)} \right)^2 - mK_1^2 \right]^{\frac{1}{2}}}{K_1^2 L_R L_B^{-1}} \right] \quad (2)$$

and, for a single fibre system, $$A\text{(dB)} = 10 \log \left[ \frac{1}{\text{invlog}\left(\frac{L_{ae}}{10}\right) \cdot \sqrt{K_1^2 L_R L_B^{-1}}} \right]$$

Note that from (1) the constant $mK_1^2$ can be determined if $A = 0$ and then $K_1^2 L_R L_B^{-1}$ if $A = 1$.

Note also that, if constants $L_R$ and $L_B$ are known, then the absolute attenuation ($K_1$) of the optical path a to $e_l$ can be calcuated.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

I claim:

1. A method of detecting loss in a branched optical fibre network comprising a first optical fibre and a plurality of second optical fibres each of which is coupled to the first optical fibre, the first optical fibre constituting a main line and the second optical fibres constituting branch lines, a respective reflector being associated with each of the branch lines, the method comprising the steps of launching a pulse into the main line and monitoring the main line for attenuation of reflected signals returning from the reflectors, a monitored attenuation of a given reflected signal being indicative of loss in the branch line associated with the reflector giving rise to that reflected signal.

2. A method as claimed in claim 1, wherein the reflected signals are monitored with respect to a reference signal.

3. A method as claimed in claim 2, wherein the reflected signals are monitored with respect to a reference reflection signal from a location positioned in the main line.

4. A method as claimed in claim 1, wherein pulses of different frequency are launched into the main line, and reflection from reflectors having different wavelength responses is monitored.

5. Apparatus for detecting losses in a branched optical fibre network comprising a first optical fibre and a plurality of second optical fibres each of which is coupled to the first optical fibre, the first optical fibre constituting a main line and the second optical fibres constituting branch lines, the apparatus comprising means for launching a pulse into the main line, a respective reflector located in the path of the pulse in each of the branch lines, and means for monitoring the main line for attenuation of reflected signals returning from the reflectors, a monitored attenuation of a given reflected signal being indicative of loss in the branch line associated with the reflector giving rise to that reflected signal.

6. Apparatus as claimed in claim 5, wherein at least one of the branch lines is provided with a plurality of reflectors.

7. Apparatus as claimed in claim 5, further comprising means for generating a reference signal, said means being located in the path of the pulse.

8. Apparatus as claimed in claim 7, wherein a reference reflector located in the main line constitutes the reference signal generating means.

9. Apparatus as claimed in claim 5, wherein each reflector is located within the associated branch line.

10. Apparatus as claimed in claim 5, wherein each reflector is located externally of the associated branch line.

11. Apparatus as claimed in claim 10, wherein each reflector is located at a termination of the associated branch line.

12. Apparatus as claimed in claim 5, wherein each reflector is a passive optical reflector.

13. Apparatus as claimed in claim 5, wherein each reflector comprises means for reflecting a distinguishable portion of the pulse.

14. Apparatus as claimed in claim 13, wherein the distinguishable portion is a particular wavelength or range of wavelengths.

15. Apparatus as claimed in claim 5, wherein each reflector is provided with means for imposing a modulation on the pulse.

* * * * *